US012228722B2

(12) United States Patent
Amthor et al.

(10) Patent No.: US 12,228,722 B2
(45) Date of Patent: Feb. 18, 2025

(54) MICROSCOPY SYSTEM AND METHOD FOR MODIFYING MICROSCOPE IMAGES IN THE FEATURE SPACE OF A GENERATIVE NETWORK

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 76 days.

(21) Appl. No.: 18/083,182

(22) Filed: Dec. 16, 2022

(65) Prior Publication Data

US 2023/0194847 A1 Jun. 22, 2023

(30) Foreign Application Priority Data

Dec. 20, 2021 (DE) ...................... 10 2021 133 868.9

(51) Int. Cl.
*G02B 21/36* (2006.01)
*G06T 7/00* (2017.01)

(52) U.S. Cl.
CPC .......... *G02B 21/367* (2013.01); *G06T 7/0012* (2013.01); *G06T 2207/10056* (2013.01); *G06T 2207/20076* (2013.01); *G06T 2207/20081* (2013.01)

(58) Field of Classification Search
None
See application file for complete search history.

(56) References Cited

U.S. PATENT DOCUMENTS

| 2005/0013478 A1* | 1/2005 | Oba ..................... G02B 21/006 359/368 |
| 2022/0130126 A1* | 4/2022 | Delgado ................. G06T 7/521 |
| 2022/0375047 A1* | 11/2022 | Gurevich ................ G06T 11/00 |

OTHER PUBLICATIONS

Xia et al., "GAN Inversion: A Survey," available at https://arxiv.org/abs/2101.05278, Mar. 22, 2022, 17 pages.
Voynov et al., "Unsupervised Discovery of Interpretable Directions in the GAN Latent Space," available at https://arxiv.org/abs/2002.03754, Jun. 24, 2020, 15 pages.

(Continued)

Primary Examiner — Eileen M Adams
(74) Attorney, Agent, or Firm — LaBatt, LLC

(57) ABSTRACT

In a computer-implemented method for modifying microscope images, a generative model is trained using a training dataset which comprises a plurality of microscope images. After the training, the generative model is configured to compute a generated microscope image from a feature vector derived from a feature space. It is established which image properties are affected by which feature variables in the feature space. A microscope image to be modified is received and projected into the feature space in order to obtain an associated feature vector. One or more feature variables of the feature vector are modified in order to change one or more image properties, whereby a modified feature vector is generated. The modified feature vector is projected back into an image space by inputting the modified feature vector into the generative model, thereby generating a modified microscope image.

20 Claims, 10 Drawing Sheets

(56) References Cited

OTHER PUBLICATIONS

Ling et al., "EditGAN: High-Precision Semantic Image Editing," available at https://arxiv.org/abs/2111.03186, Nov. 4, 2021, 38 pages.
Gu et al., "GIQA: Generated Image Quality Assessment," available at https://arxiv.org/abs/2003.08932, Jul. 14, 2020, 26 pages.
Mikhailiuk, Aliaksei, "Deep Image Quality Assessment—Towards Data Science," https://towardsdatascience.com/deep-image-quality-assessment-30ad71641fac, Mar. 15, 2021, 19 pages.
Sertis, "GAN Inversion: A brief walkthrough—Part I—Sertis—Medium," https://sertiscorp.medium.com/gan-inversion-a-brief-walkthrough-part-i-bc2ee1b73253, Nov. 8, 2021, 12 pages.
Goodfellow et al., "Generative Adversarial Nets," available at https://arxiv.org/abs/1406.2661, Jun. 10, 2014, 9 pages.
Gao et al., "A Review of Active Appearance Models," IEE Transactions on Systems, Man, and Cybernetics—Part C: Applications and Reviews, vol. 40, No. 2, Mar. 2010, pp. 145-158.
Kaust et al., "Image2StyleGAN++: How to Edit the Embedded Images?" available at https://arxiv.org/abs/1911.11544, Aug. 7, 2020, 18 pages.
Shen et al., "Interpreting the Latent Space of GANs for Semantic Face Editting," available at https://arxiv.org/abs/1907.10786, Mar. 31, 2020, 12 pages.
Nguyen et al., "Deep Learning for Deepfakes Creation and Detection: A Survey," available at https://arxiv.org/abs/1909.11573v5, Aug. 11, 2022, 19 pages.
Karras et al., "A Style-Based Generator Architecture for Generative Adversarial Networks" available at https://arxiv.org/abs/1812.04948, Mar. 29, 2019, 12 pages.
Karras, T., et al., "Analyzing and Improving the Image Quality of StyleGAN" available at https://arxiv.org/abs/1912.04958, Mar. 23, 2020, 21 pages.
Kaust et al., "Image2StyleGAN: How to Embed Images Into the StyleGAN Latent Space?" available at https://arxiv.org/abs/1904.03189, Sep. 3, 2019, 23 pages.
Cootes et al., "Active Appearance Models," in IEEE Transactions on Pattern Analysis and Machine Intelligence, vol. 23, No. 6, Jun. 2001, pp. 681-685.

* cited by examiner

| W | Image properties B |
|---|---|
| a | → Color of an adhesive label |
| b | → Visibility of the clips |
| c | → Contamination on the sample carrier |
| d | → Illumination |
| e | → Visibility of a background |
| ... | |
| u | → Position of the holding frame |

FIG. 7

$$F: \begin{bmatrix} 0 * a \\ 0 * b \\ F_1 * c \\ F_2 * d \\ F_3 * e \\ ... \\ 0 * u \end{bmatrix} \rightarrow \text{Visibility of cover slip edges}$$

FIG. 8

MICROSCOPY SYSTEM AND METHOD FOR MODIFYING MICROSCOPE IMAGES IN THE FEATURE SPACE OF A GENERATIVE NETWORK

REFERENCE TO RELATED APPLICATIONS

The current application claims the benefit of German Patent Application No. 10 2021 133 868.9, filed on 20 Dec. 2021, which is hereby incorporated by reference.

FIELD OF THE DISCLOSURE

The present disclosure relates to a microscopy system and a method for modifying microscope images.

BACKGROUND OF THE DISCLOSURE

Overview images are frequently captured with modern microscopes. Overview images can be used for a sample navigation or processed (partially) automatically in order to control or monitor processes of the microscope. However, certain image content or image properties in particular in this type of microscope image can hamper an automatic processing. For example, an overview image of a sample carrier can display annotations written on the sample carrier, which may cause processing errors in an automated processing. If a background is visible through the sample carrier, an image processing program may not be able to reliably differentiate between the background and structures on the sample carrier, e.g. a cover slip or the actual sample. Holding clips used to hold a sample carrier on the microscope stage can also interfere in an overview image. It is consequently desirable for certain image content or image properties to be modified in a pre-processing of a microscope image. Programs designed for specific applications are conceivable, for example for suppressing or removing handwritten annotations in an image of a sample carrier. However, this makes achieving a reliably high image-processing quality for a large variety of different image content in microscope images difficult. Providing corresponding programs for a large variety of different image content to be modified and updating such programs in the event of novel microscope images also involves considerable effort.

In general, machine-learned models are increasingly being implemented in image processing. Reference is made to the following publications as background:

Karras, T., et al., "A Style-Based Generator Architecture for Generative Adversarial Networks" in arXiv: 1812.04948v3 [cs.NE] 29 Mar. 2019: A GAN with which images of human faces are generated is described. A portrait image is generated in which the style (e.g., pose, hairstyle, face shape and glasses) is adopted from a predetermined image.

Karras, T., et al., "Analyzing and Improving the Image Quality of StyleGAN" in arXiv:1912.04958v2 [cs.CV] 23 Mar. 2020: This document describes a redesigned normalization of the generator of the StyleGAN in order to avoid artefacts in generated StyleGAN images, in particular blob-like ovals in portraits or images of vehicles and animals.

Rameen, A., et al., "Image2StyleGAN: How to Embed Images Into the StyleGAN Latent Space?" in arXiv: 1904.03189v2 [cs.CV] 3 Sep. 2019: This document describes a way to project a given image into the feature space of a ready-trained StyleGAN network.

Rameen, A., et al., "Image2StyleGAN++: How to Edit the Embedded Images?" in arXiv:1911.11544v2 [cs.CV] 7 Aug. 2020: This article describes how, for a provided image, an image that approximates the provided image can be generated by means of the generator of a GAN. As illustrated in FIG. 8 in the article, it is possible to provide a scribbled image for which the generator automatically reconstructs an image that appears relatively genuine.

Cootes, T. F., et al., "Active Appearance Models" in IEEE TRANSACTIONS ON PATTERN ANALYSIS AND MACHINE INTELLIGENCE, VOL. 23, NO. 6, JUNE 2001: This document describes a parameterized model by means of which a provided image, e.g. a photo of a human face, can be reconstructed.

SUMMARY OF THE DISCLOSURE

It can be considered an object of the invention to provide a microscopy system and a method which enable a quality enhancement of captured microscope images in a flexible manner. The quality enhancement can relate to, for example, a suppression of interfering image artefacts or irrelevant elements or to an enhancement of the visibility of relevant structures.

This object is achieved by means of the methods and the microscopy system with the features of the independent claims.

A method according to the invention for modifying microscope images comprises at least the following steps:

- A generative model is trained using a training dataset which comprises a plurality of microscope images so that, after the training, the generative model is configured to calculate a generated microscope image from a feature vector derived from a feature space.
- It is established which image properties are affected by which feature variables in the feature space.
- A microscope image to be modified is received.
- The microscope image to be modified is projected into the feature space in order to obtain an associated feature vector.
- One or more image properties are changed by modifying one or more feature variables of the feature vector, whereby a modified feature vector is generated.
- The modified feature vector is projected back into an image space by inputting the modified feature vector into the generative model, thereby generating a modified microscope image.

Thus, a generative model is initially learned which can generate microscope images that appear to come from a statistical distribution of predetermined microscope images of the training dataset. Generated microscope images thus closely resemble the predetermined microscope images of the training data in terms of their type so that it may not be possible to distinguish whether a microscope image is generated or genuine. An image content or an image property of a microscope image to be modified is then changed, not by changing the microscope image itself, but by changing a feature vector corresponding to the microscope image to be modified. The modified microscope image is then calculated from the modified feature vector.

In a further embodiment of the invention, a ready-trained generative model is used so that it is not necessary to carry out the steps of the training as part of the claimed method. Such a method according to the invention for modifying microscope images comprises at least the following steps:

A microscope image to be modified is received.

A modified microscope image is generated by means of a generative model, wherein the generative model is trained, using a training dataset which comprises a plurality of microscope images, to calculate a generated microscope image from a feature vector derived from a feature space. A relationship between one or more image properties and a respective feature variable in the feature space is recorded. To generate the modified microscope image by means of the generative model, at least the following steps are performed:

The microscope image to be modified is projected into the feature space in order to obtain an associated feature vector.

One or more feature variables of the feature vector are modified in order to change one or more image properties, whereby a modified feature vector is generated.

The modified feature vector is projected back into an image space by inputting the modified feature vector into the generative model, thereby generating a modified microscope image.

The invention makes it possible to change image properties, in particular image content, in a relatively simple manner so as to achieve results that appear genuine. It is thus possible to, inter alia, compensate for unfavorable imaging conditions, remove potentially interfering structures on sample carriers from the microscope image, highlight image structures to be analyzed, suppress a background, or reduce image noise. The thus modified microscope image can be easier to interpret for an observer and/or yield more reliable results in a subsequent image processing.

The invention also relates to a microscopy system which comprises a microscope for capturing microscope images and a computing device which is configured to carry out the method according to the invention.

The invention additionally relates to a computer-readable storage medium comprising commands which, when executed by a computer, cause the computer to execute the method according to the invention.

Optional Embodiments

Variants of the microscopy system according to the invention and of the method according to the invention are the object of the dependent claims and are explained in the following description.

Generative Model

A generative model can generally be understood as a model or neural network which has been adapted to be able to generate from an input, in particular from a random input, images that appear to come from a statistical distribution of predetermined microscope images of a training dataset. Generated images thus correspond to the microscope images of the training dataset in terms of their type.

The generative model can be formed by a generator of a generative adversarial network (GAN). A GAN comprises two networks, namely a generator and a discriminator, which are trained together using the training dataset. The generator generates an output image from an entered (random) vector. The discriminator receives the microscope images of the training dataset and the generated output images of the generator as input. The discriminator is intended to establish whether an input image is a genuine image, i.e. a microscope image of the training dataset, or a generated output image. A loss function to be minimized or a reward function to be maximized is defined accordingly. Conversely, the generator is intended to be able to generate output images for which the discriminator is unable to assess correctly whether they originate in the training dataset. The loss/reward function of the generator thus results from the loss/reward function of the discriminator and both are trained at the same time, i.e. in alternating steps. Upon completion of the training, the generator is able to generate, from a random vector, an image that corresponds in type and content to the distribution of the microscope images of the training data. It is also possible to use a StyleGAN as explained in greater detail later on. The terms "generative adversarial network" and "generative adversarial networks" in the singular and plural are intended to be understood as fundamentally synonymous in the present disclosure.

The generative model can alternatively be formed by a decoder of an autoencoder. An autoencoder comprises an encoder and a subsequent decoder. In the training, the microscope images of the training dataset are input into the encoder. From each microscope image, the encoder calculates a feature vector, which is a compressed representation of the input image. A space formed by all possible feature vectors is called a latent space or feature space. The feature vector generated by the encoder is input into the decoder, which calculates an output image therefrom. A loss function measures differences between the output image and the associated microscope image. Through minimization of the loss function, the autoencoder is trained to be able to generate output images that resemble the microscope images of the training dataset. As described in greater detail later on, the decoder can be implemented after the training separately as a generative model of embodiments of the invention.

An autoencoder can in particular take the form of a variational autoencoder. In this case, the encoder does not generate a point in the latent space but rather a distribution. The distribution can be defined by a (centre) point and a width. An input of the decoder is now randomly drawn from the distribution provided by the encoder. This reinforces that points lying close together in the latent space to result in similar generated images. An order or structure of the latent space is thus increased.

Alternatively, it is also possible for the generative model to be learned by principal component analysis (PCA) using the training dataset. A plurality of microscope images of the training dataset can be identical except for one image property; for example, the microscope images can differ alone in a brightness or in reflections on the sample or sample carrier. By means of PCA, it is possible to establish a parameter which modifies brightness and otherwise leaves a microscope image unchanged. It is also possible to use PCA to establish a further parameter by means of which reflections can be amplified or reduced.

An active appearance model can also act as a generative model. In an active appearance model, a shape model determines the position of prominent points and thus takes into account the shape variations of structures depicted in the microscope images of the training dataset. Prominent points can be predetermined in the form of annotations for the training dataset. A texture model determines texture variations, i.e. different pixel values, after the microscope images have been brought into a uniform shape by the shape model. The models can likewise be established by PCA.

An output of a generative model is or comprises an image. For conciseness, different embodiments are described in the present disclosure in which a single image is output. Generally speaking, this is intended to be understood in the sense of "at least one" image so that, depending on its design, the generative model is also capable of outputting a plurality of images or three-dimensional/volumetric image data from an input.

Feature Vector and Feature Space

Inputs/input data entered into the ready-trained generative model can be understood as feature vectors. The feature vector can in principle have any dimension, i.e. be formed by in principle any number of parameters, which can in particular be independent of one another and which can be called feature variables. The feature vector defines a point in a space called feature space or latent space. The generative model generates a mapping of a point of the latent space onto an output image, i.e. onto a generated microscope image. The generative model is thus able to generate a microscope image that looks genuine from a (in particular random) feature vector. A feature vector can also be described as a representation of an associated microscope image in the feature space and is also referred to as a latent space representation, latent code or latent vector.

An input can be fed to the generative model at one or more different points. An input thus does not necessarily have to be fed (exclusively) to a first layer of the generative model, but can alternatively or additionally be fed to one or more other layers, as in the case of a StyleGAN architecture. In the case of an input at a plurality of points in the generative model, the same vector or different vectors can be input at the plurality of points. A feature vector in the sense of this application can represent the input data or input vectors collectively.

It is possible for a further neural network to be implemented in the training upstream of the generative model. If the generative model is the generator of a StyleGAN, a mapping network, for example, is used in a first step. The mapping network can comprise, e.g., a plurality of fully connected layers and generates from entered data an output which is input into the generator. The mapping network thus performs a mapping of input data, i.e. a mapping of a random vector/feature vector z from a feature space Z, to a (feature) vector w in another feature space W. The feature space W can be better adapted to the training image data compared to the feature space Z so that feature variables or axes of the feature space W are better separated from one another than the axes of the feature space Z in terms of the image properties they encode. Although it is in principle possible for the modification of a feature vector described in greater detail later on to occur in the feature space Z, a modification in the feature space W can be preferable.

Semantics of Feature Variables of the Feature Space

A proximity between points in the feature space corresponds to a similarity of the associated generated microscope images. A direction in the feature space typically determines an image property. It is thus possible to establish, through investigation of the feature space, how image properties relate to directions in the feature space. Axes of the feature space can be orthogonal to one another and can be called feature variables. The entries of a feature vector are accordingly values of the various feature variables that span the feature space and are also referred to as parameters of the feature vector in the present disclosure. If a feature variable is changed for a given feature vector, it is possible to observe an effect in the generated microscope image. It can be established in this manner which image property relates to the feature variable. This can be carried out for each feature variable or axis of the feature space in order to identify different modifiable image properties. This way, a user or computer program can systematically change components of feature vectors and observe which image property changes with which component in order to establish a correlation between feature variables and image properties.

To investigate the feature space, it is also possible to respectively use two microscope images which differ alone in one image property of interest: The difference between their representations in the feature space is a vector, which corresponds to a feature variable and which can exhibit essentially any orientation in the feature space. This feature variable thus describes the difference between the two microscope images with respect to the image property. For example, the two microscope images can differ alone in a contamination of the sample carrier. It is thereby possible to establish a feature variable that affects a sample carrier contamination in the generated microscope image. It is also possible for more than two microscope images to be classified into two groups according to an image property of interest. For example, microscope images which show different sample carrier types can be classified into one of the two groups as a function of their sample carrier contamination. The feature vectors are then averaged for all microscope images of the same group, i.e. a centroid is calculated from the points in the latent space. A difference or vector between the two centroids of the two groups defines a feature variable, which in the aforementioned example encodes the image property "sample carrier contamination". Generally speaking, it is also possible to form, instead of two groups, a plurality of ordinal groups into which the microscope images are sorted, for example into the four groups: Sample carrier contamination: very low/low/high/very high. The feature vectors of microscope images of the same group are then averaged to form a centroid. A difference between the centroids of two consecutive groups (e.g., the groups "sample carrier contamination very low" and "sample carrier contamination low") now forms a feature variable between these groups.

In order to determine a relationship regarding an image property (e.g. reflections present: yes or no), it is also possible to establish a hyperplane in the feature space. A hyperplane is a multi-dimensional plane whose dimension is 1 less than the dimension of the feature space. A plurality of microscope images are divided into two groups according to an image property of interest, for example whether or not interfering reflections are visible in the microscope image. A respective representation (a point) in the latent space is established for the microscope images. A hyperplane is then established which separates the points of the two groups as accurately as possible. A vector perpendicular to the hyperplane indicates a feature variable: In the cited example, a given feature vector, i.e. a point in the feature space, can be shifted according to the vector established in the described manner in order to amplify or attenuate an interfering reflection in the associated microscope image.

A semantics of feature variables can also be established by means of a classification or regression model. A prerequisite here is a plurality of images with associated feature vectors. The images are classified manually or by means of a program with respect to one or more image properties and one or more corresponding annotations are assigned, e.g. "contamination on the sample carrier low/medium/high". A classification or regression model is now trained to calculate from the feature variables predictions to match the annotations. Thus learned functions of the model can subsequently be used in the feature space as transition directions which describe the associated image property. This establishes, e.g., a direction in the feature space that affects the image property "contamination on the sample carrier" between the classes "low/medium/high".

Projecting the Microscope Image to be Modified into the Feature Space

A microscope image to be modified is not changed directly; rather, in a first step, a feature vector corresponding to a generated microscope image that is as consistent as possible with the microscope image to be modified is established. In other words, a feature vector is sought which, when input into the generative model, yields a generated microscope image that is ideally identical to the microscope image to be modified. Finding this feature vector can be referred to as projecting or "embedding" the microscope image to be modified into or in the feature space. Different options exist for this calculation depending on the design of the generative model.

For example, it is possible to start with an initial feature vector w. An optimized feature vector w* is now sought which optimizes a loss function measuring the similarity between a predetermined image (i.e. the microscope image to be modified) and the output image calculated by the generative model from the input feature vector. The initial feature vector w can consist of, e.g., random values or be predetermined in some way. The iterative adjustment for calculating the optimized feature vector w* can be calculated via a gradient descent method, which is also called projected gradient descent (PGD). A similarity between a predetermined image and an output image can be measured for each pixel directly with such an image pair. Alternatively, it is also possible to measure, for example, a perceptual loss to which end a pre-trained feature extractor, e.g. a VGG network, is used in order to respectively calculate an output (abstract features) from the predetermined image and from the output image, and the distance or difference between the abstract features is minimized by adjusting the feature vector w in the latent space.

Alternatively, an encoder can be learned which calculates a projection of a predetermined image onto a representation in the latent space, i.e. a correlation between the predetermined image and a representation in the latent space. Such an encoder can be, e.g., the encoder of a variational autoencoder, which is particularly suitable if the decoder of the variational autoencoder is used as the generative model. If, on the other hand, the generative model is learned by means of a GAN architecture, a separate encoder can be learned upon completion of the training of the GAN.

For example, this encoder can be trained using pairs of predetermined microscope images and associated feature vectors in a supervised learning process to calculate, from the predetermined microscope images, feature vectors which ideally match the predetermined feature vectors.

Alternatively, the encoder can be trained to calculate feature vectors from predetermined microscope images by inputting the output of the encoder into the ready-trained generative model. The ready-trained generative model calculates, from the outputs of the encoder, generated microscope images whose correspondence with the predetermined microscope images is measured by a loss function to be optimized. Alternatively, a GAN can be supplemented by an encoder so that the encoder is trained together with the generator and the discriminator. Upon completion of the training, the encoder can be used directly in the inference phase in order to calculate an associated latent code/feature vector from a microscope image to be modified.

If a reversible generative model is used as the generative model, an associated feature vector in the latent space can be calculated directly from a microscope image to be modified by means of the reversible generative model without the need for the approximation techniques described in the foregoing.

Image Properties

The one or more image properties that can be modified by a change in the feature vector can relate to one or more of the following:

an exposure of an image or image area, e.g. of an object in the image, such as an adhesive label, sample carrier or cover slip area, wherein a modification of the feature vector is in particular able to compensate an overexposure or underexposure;

a contamination of a sample carrier or cover slip area, wherein a modification of the feature vector can change, in particular reduce, a degree of contamination visible in the modified microscope image in the image area of the sample carrier or cover slip;

a contrast of cover slip edges, wherein a modification of the feature vector can change a visibility of cover slip edges, in particular a difference in brightness between cover slip edges and adjacent image areas;

reflections, local dimming or other artefacts on a sample carrier, wherein a modification of the feature vector affects an intensity of reflections, local dimming or other artefacts;

background artefacts visible through a transparent sample carrier, for example LEDs or other light sources of an overview illumination unit, wherein the background artefacts can be attenuated or removed via a modification of the feature vector;

a background illumination or brightness; in particular, an image brightness in image areas outside the sample carrier can be changed via a modification of the feature vector;

labelling on a sample carrier; for example, a visibility of labelling can be reduced via a modification of the feature vector.

Each of the cited image properties can be defined or influenced by a respective feature variable. A feature vector comprises all feature variables so that an image property can be changed in a targeted manner by changing the corresponding feature variable of the feature vector.

Modifying the Feature Vector

A modification of the feature vector for a microscope image is carried out by changing one or more of the parameters (feature variables) of the feature vector.

To this end, it is possible to provide a selection option via which a user can specify an intended change in the at least one image property. One or more feature variables of the feature vector are modified in accordance with the intended change. For example, a slider or number input field can be provided on a computer screen together with a designation of the associated image property so that, for example, it is possible to change the image property "contamination of the sample carrier" via a slider. The modified microscope image calculated with the image property change currently specified by the user can optionally be displayed together with the selection option. The effect of a change can thus be viewed directly so that the user can establish a suitable modification. Optionally, the microscope image to be modified is also displayed together with the selection option and the modified microscope image.

Alternatively or additionally, a modification of a feature variable of the feature vector can occur automatically or be proposed according to predetermined criteria. An automatically proposed modification can be, for example, the start value of a feature variable which can subsequently be changed manually by means of the described slider. Alternatively, an automatic modification can also be carried out without any user interaction. An automatic modification can occur, for example, by means of a threshold value comparison, wherein a feature variable is changed in the direction of a predetermined ideal value as a function of the threshold value comparison. For example, if a feature variable describes the image property "contrast of cover slip edges", a threshold value for a minimum contrast can be stored in the form of a minimum value of this feature variable. If the minimum contrast is not reached, the feature variable is automatically changed to the threshold value or to a higher value so as to attain the minimum contrast in the modified microscope image.

The thus modified feature vector is input into the generative model, which calculates a generated microscope image therefrom, which is called the modified microscope image.

Checking the Modified Microscope Image

An automatic check of the modified microscope image can be carried out in order to reduce the likelihood that any image errors caused by the modification go unnoticed. The modified microscope image can be input into a trained inspection model to this end. The latter can be trained to establish whether image artefacts were caused by the modification of the feature vector. An output of the inspection model can thus be a confidence estimate regarding whether the modified microscope image is trustworthy. The inspection model can take the form of, e.g., an anomaly detector and be learned by means of an unsupervised learning process using training data comprising exclusively (modified or unmodified) microscope images that have been classified as correct or trustworthy by a user.

The inspection model can also be formed by the discriminator of a generative adversarial network (GAN). If the generative model is formed by a generator of a GAN, the discriminator of this GAN can be implemented as the inspection model. The modified microscope image is input into the discriminator, which outputs an estimate as to whether the modified microscope image is genuine or generated. If the discriminator assumes a genuine microscope image, it can be assumed that no image artefacts were created by the modification of the feature vector. The discriminator can be designed as a regression model and accordingly output a free value within a number range, wherein the upper and lower limits of the number range respectively represent a reliable classification into a genuine or replicated microscope image. In order to form the inspection model, a threshold value between these classifications can generally be defined arbitrarily.

Subsequent Image Utilization

The modified microscope image can subsequently be used or further processed in a workflow of the microscope. For example, the modified microscope image can act as a navigation map or serve to form a navigation map on which a user can select a location which can then be automatically positioned or analyzed by the microscope. For example, a motorized sample stage can be automatically adjusted so that a selected location lies on an optical axis of an objective in use or in the image centre of images to be captured.

The modified microscope image can also be input into an image processing program, which calculates an image processing result for an input image. The image processing program can be, e.g., a machine-learned segmentation model, detection model, classification model or a model for image-to-image mapping. An image-to-image mapping can effect, for example, a virtual staining, a noise suppression or a resolution enhancement. Segmentation, detection or classification can be used to establish, for example, the presence, a type and/or a position of certain components, for example of a sample carrier, cover slip or sample. The method according to the invention is carried out in a first step, whereby a modified microscope image is calculated. The latter is then entered into the image processing program. The modification of one or more feature variables of the feature vector can occur in accordance with requirements of the image processing program (automatically). For example, a requirement can be that limits stipulated for the image processing program pertaining to image contrast, image noise or sample carrier contamination must be observed, as otherwise the image processing program may not function reliably. If the feature variables of a microscope image to be modified indicate that the stipulated limits are not observed, the feature variables are modified accordingly. The thus calculated modified microscope image is then input into the image processing program, which calculates the image processing result therefrom.

Microscope Images

A microscope image can be understood as an image captured by a microscope or calculated using measurement data of a microscope. In particular, the microscope image can be formed by one or more raw images or by already processed images of the microscope. The microscope image can also be an overview image of an overview camera on the microscope or have been calculated from measurement data of at least one overview camera. If the microscope in question is a light microscope, the microscope image can also be a sample image captured by a sample camera which is provided in addition to the overview camera and which captures an image with a higher magnification than the overview camera. It is also possible for microscope images to have been generated by other types of microscopes, for example by electron microscopes or atomic force microscopes.

The described modification of the feature vector is particularly suitable for overview images. If there should occur undesired changes in the image content of the actual sample as a result of the modification, such changes are less damaging with overview images than they are with sample images. For example, if the overview image is used for sample navigation or to identify a sample carrier being used, undesired changes in the image content of the sample typically do not have any negative consequences.

General Features

A microscopy system denotes an apparatus which comprises at least one computing device and a microscope. A microscope can in particular be understood as a light microscope, an X-ray microscope, an electron microscope or a macroscope.

The computing device can be designed in a decentralized manner, be physically part of the microscope or be arranged separately in the vicinity of the microscope or at a location at any distance from the microscope. It can generally be formed by any combination of electronics and software and can comprise in particular a computer, a server, a cloud-based computing system or one or more microprocessors or graphics processors. The computing device can also be configured to control microscope components.

Method variants can optionally comprise the capture of at least one microscope image by the microscope while in other method variants an existing microscope image is loaded from a memory.

Descriptions in the singular are intended to cover the variants "exactly 1" as well as "at least one". Descriptions according to which a microscope image is input into one of the described models are intended to comprise, for example, the possibilities that exactly one or at least one microscope image is used. A common processing of a plurality of microscope images can be suitable, e.g., when the microscope images form an image stack (z-stack) showing sample layers of a same sample at different depths or are images of the same sample captured in succession. Volumetric image data is also intended to be understood in the context of the present disclosure as "a plurality of microscope images" so that it is also possible to establish and modify a feature vector pertaining to volumetric image data.

A generative model and other learned models described herein can be learned by a learning algorithm using training data. The models can respectively comprise, for example, one or more convolutional neural networks (CNNs), which receive a vector, at least one image or image data as input. A learning algorithm uses the training data to define model parameters of the model. A predetermined objective function can be optimized to this end, e.g. a loss function can be minimized. The model parameter values are modified to minimize the loss function, which can be calculated, e.g., by gradient descent and backpropagation. In the case of a CNN, the model parameters can in particular comprise entries of convolution matrices of the different layers of the CNN. Layers that do not follow each other directly can optionally be connected by so-called "skip connections", whereby the output of a layer is passed on not only to the immediately following layer but additionally to another layer. Other deep neural network model architectures are also possible. A space of possible outputs of the generative network is called an image space.

The characteristics of the invention that have been described as additional apparatus features also yield, when implemented as intended, variants of the method according to the invention. Conversely, a microscopy system or in particular the computing device can also be configured to carry out the described method variants. While a ready-trained model is used in some variants, other variants of the invention result from the implementation of the corresponding training steps, and vice versa.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIG. 7 schematically indicates a semantics of feature variables;

FIG. 8 schematically shows a further feature variable;

DETAILED DESCRIPTION OF EXAMPLE EMBODIMENTS

Different example embodiments are described in the following with reference to the figures.

FIG. 1

Figure 1:
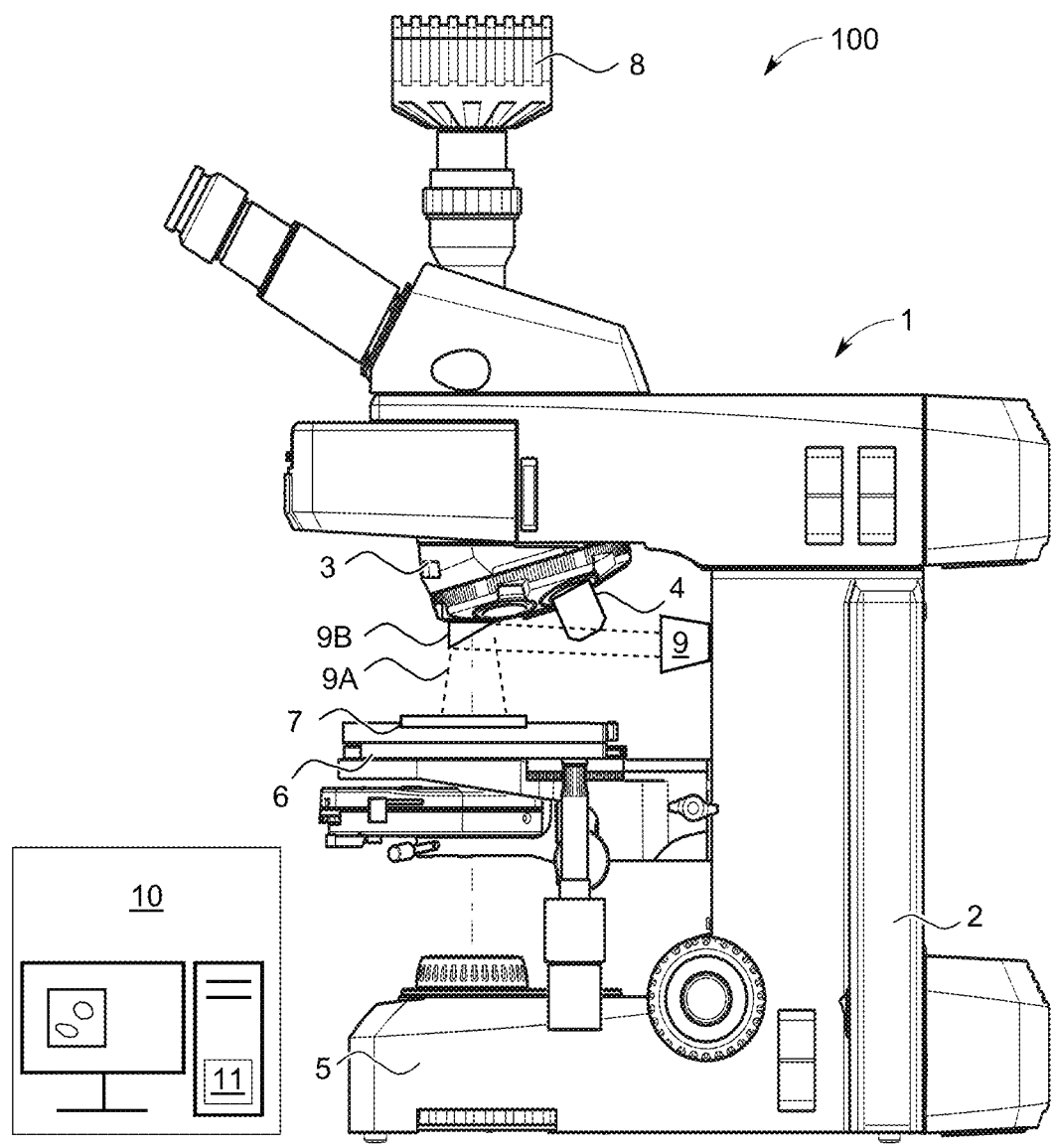
FIG. 1 schematically shows an example embodiment of a microscopy system of the invention.

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 8. When the objective 4 is pivoted into the light path of the microscope, the microscope camera 8 receives detection light from a sample area in which a sample can be located in order to capture a microscope image. A sample can be any object, fluid or structure. The microscope 1 optionally comprises an additional overview camera 9 for capturing an overview image of a sample environment. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror is omitted or a different arrangement of the mirror or some other deflecting element is provided. The computing device 10 comprises a computer program 11 stored on a data carrier for processing a microscope image according to a method according to the invention. This is discussed in greater detail with reference to the following figures.

FIG. 2

Figure 2:
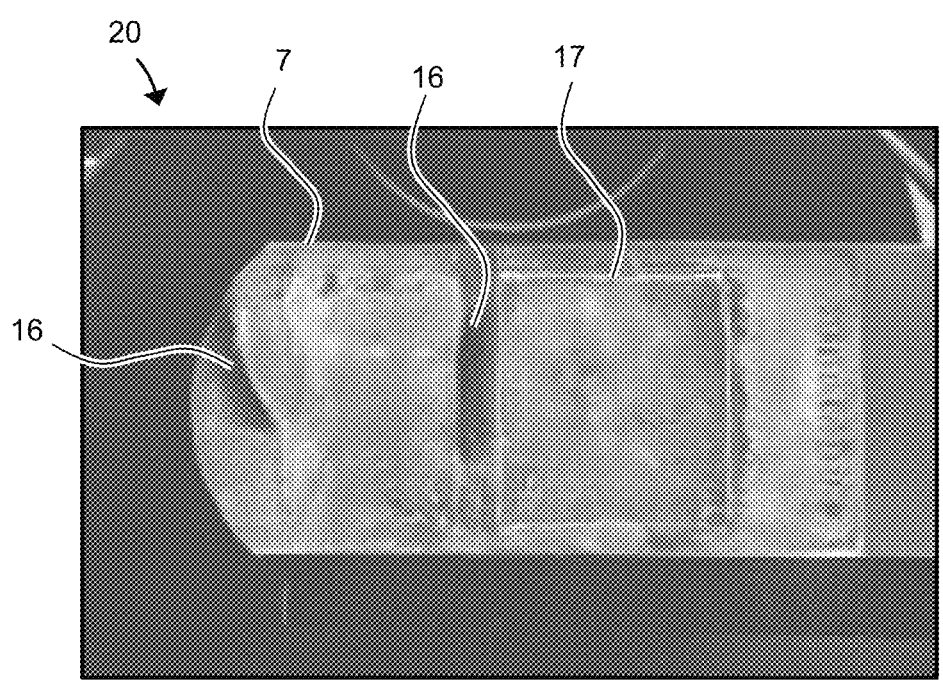
FIG. 2 schematically shows a microscope image to be modified.

FIG. 2 schematically shows a microscope image 20, which in this example is an overview image of an overview camera. In principle, however, a sample image captured using a microscope objective can also serve as a microscope image.

A sample carrier 7 with a cover slip is discernible in the microscope image 20. Cover slip edges 17 appear as a bright frame. Clips of a holding frame 16 appear as dark shadows and impair the image quality. Should the microscope image 20 be used, for example, as a navigation map, the depiction of the holding frame 16 may irritate a user. Moreover, the darker image areas of the holding frame 16 can impair a potential subsequent processing, for example a segmentation or an automatic detection and positioning of an area within the cover slip edges 17.

Image processing is intended to improve an image quality of the microscope image 20 and in particular to remove artefacts such as the shadows of the holding frame 16. However, a corresponding modification is not carried out in the microscope image 20 itself, but rather in a representation of the microscope image 20 in the form of a feature vector from which a generative model can calculate an image. This is described in greater detail in the following.

Figure 3:
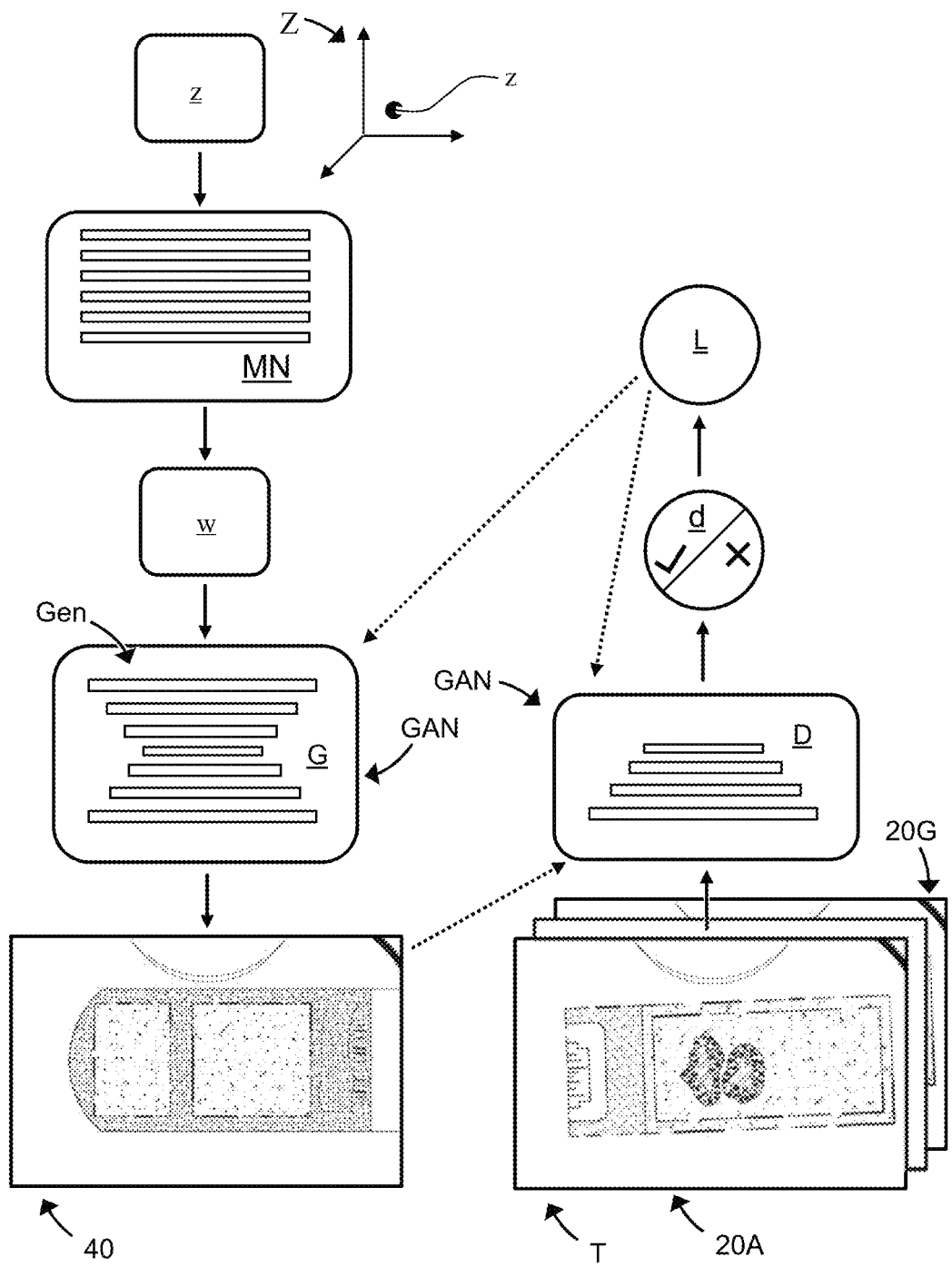
FIG. 3 schematically shows the structure and a training of a GAN according to example embodiments of methods of the invention.
Figure 4:
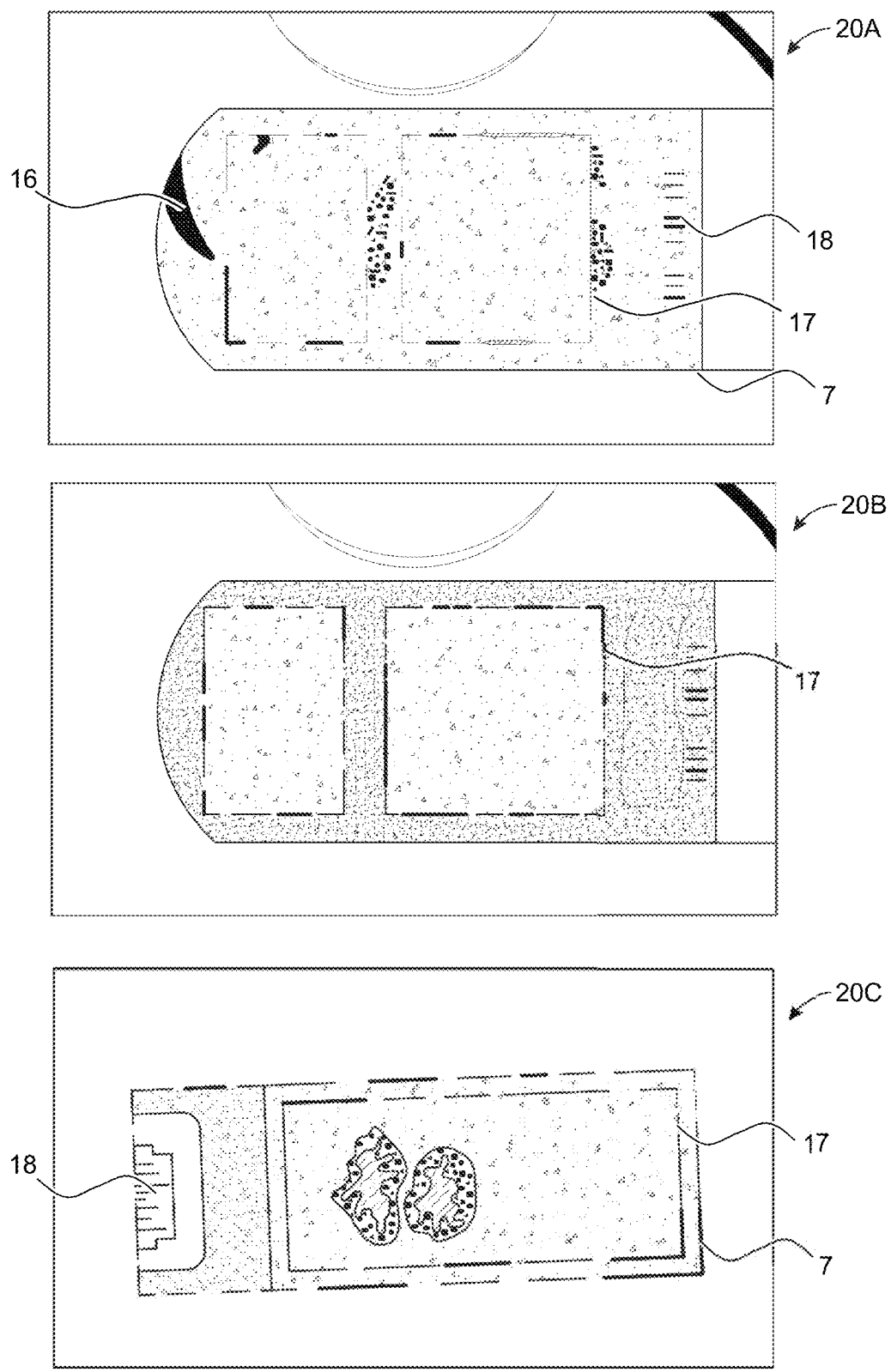
FIG. 4 schematically shows training images.
Figure 5:
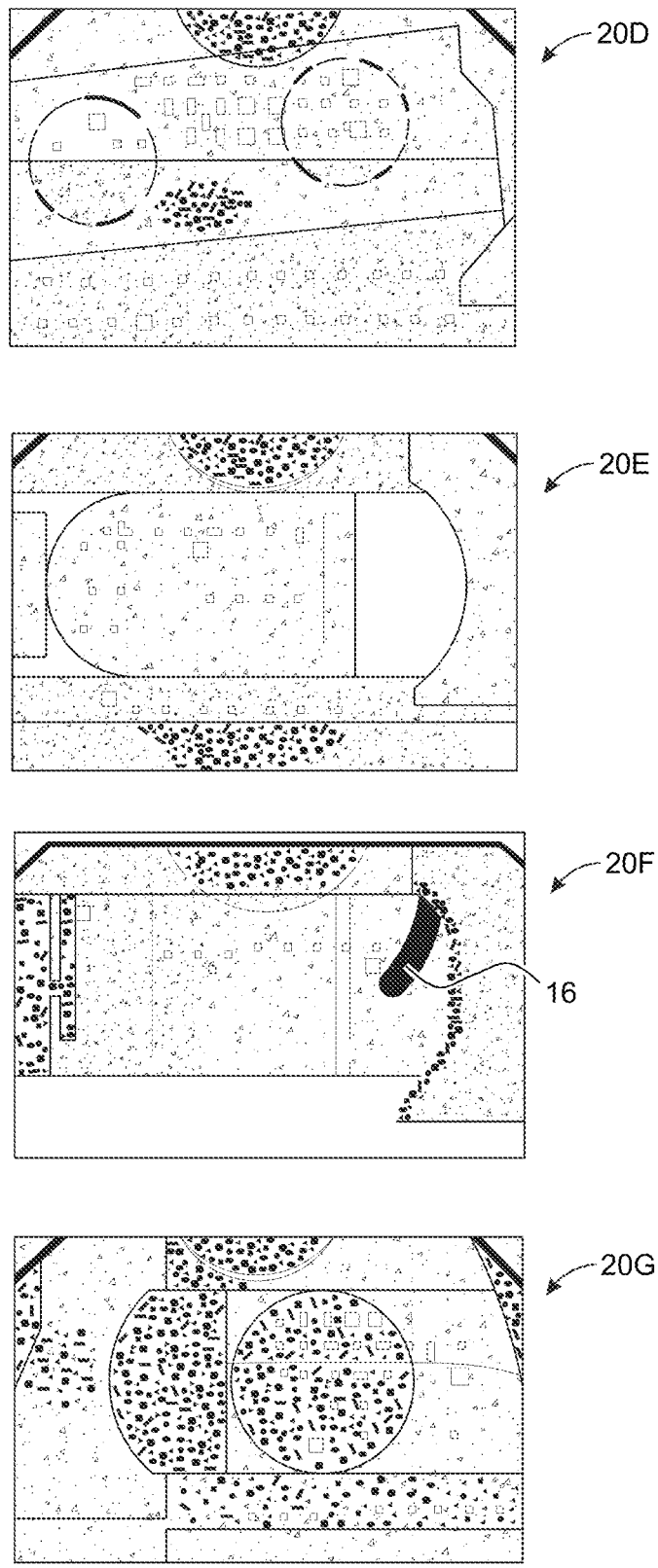
FIG. 5 schematically shows further training images.

FIGS. 3 to 5

FIG. 3 schematically shows the structure and the training of generative adversarial networks GAN comprising a generator G and a discriminator D. In the illustrated example, a network called a mapping network MN is also used. This can be considered part of the GAN or as a separate network upstream of the GAN. The generator G is also referred to in the present disclosure as generative network Gen.

The generator G is intended to be able to generate generated images (microscope images) 40 that are indistinguishable from predetermined training images T, which can be captured microscope images. Indistinguishable can be understood in the sense that generated images 40 appear to come from the same distribution as the training images T so that the discriminator D is not able to distinguish generated images 40 from training images T.

A training dataset or training images T are shown by way of example in FIGS. 4-5. The training images T comprise microscope images 20A-20G, which should be representative of the microscope images that will be processed after the training. The microscope images 20A-20G are overview images of sample carriers and differ with respect to a plurality of image properties, in particular with respect to a visibility of a cover slip and cover slip edges 17, contaminants on the sample carrier 7 (e.g. dust particles, lint or fingerprints), a visibility of a labelling field 18, image brightness and contrast and darkened areas caused by holding clips 16 for the sample carrier 7.

A training of the GAN using the training images T is described in the following with reference to FIG. 3. A starting vector, e.g. a random vector z chosen from a space Z, is input into a network called a mapping network MN. The random vector z comprises a plurality of variables that are independent of one another, for example 512 variables, whose values can be chosen randomly. The mapping network MN can comprise, e.g., a plurality of fully connected layers through which the starting or random vector z is mapped to a vector w. The vector w can have a dimension different from the random vector z or the same dimension as the random vector z, i.e. consist of, e.g., 512 variables. In general, the vector w determines a point in a space W, which is also called the feature space W.

The vector w is input into the generator G, which can comprise, inter alia, a plurality of convolutional layers. An output of the generator G in this example is a two-dimensional image, which is called a generated image or generated microscope image 40 in the present disclosure.

Either a (genuine) microscope image 20A-20G of the training data T or a generated microscope image 40 of the generator G is input into the discriminator D. An output of the discriminator D should be a discrimination result d that indicates whether the discriminator D classifies an input image as a genuine microscope image 20A or as a generated microscope image 40. The discrimination result d is entered into a loss function L. In order to adjust model parameter values (weights) of the generator G, the loss calculated by the loss function L is run through the layers of the discriminator D and subsequently through the layers of the generator G by means of backpropagation, wherein gradients for modifying the respective model parameter values are obtained for each layer. In order to adapt the generator G in a training step, typically alone the model parameter values of the generator G are modified, e.g. entries of its convolution matrices, while the discriminator D remains unchanged. The mapping network MN can be trained together with the generator G, in particular likewise via the loss function and backpropagation implemented for the generator G. In a training step for the discriminator D, the loss calculated by the loss function L by means of backpropagation is used to adjust model parameter values of the discriminator D. It is possible to use different loss functions in the training, namely a generator loss function and a discriminator loss function. These can be derived from the same loss function L, e.g., by omitting in the training of the generator the parts of the loss function L which relate to discrimination results d for input genuine microscope images 20A-20G. The GAN can also be designed as a Wasserstein GAN, in which a modified (vis-à-vis classic GANs) loss function L is used.

In the training of the generator G, the model parameter values of the latter are modified so that the discriminator D is ideally unable to distinguish generated microscope images 40 from genuine microscope images 20A-20G.

Upon completion of the training, the generator G is able to generate microscope images that appear genuine from different vectors in the space Z from which the random vector z derives or from different vectors in the space W from which the feature vector w derives. By means of the training of the generator G, the spaces Z and W obtain a structure, i.e. points or vectors close together in the space Z or in the space W result in similar microscope images, while points that are more distant from one another result in very different microscope images. The spaces (feature spaces) Z and W are spanned by a plurality of axes or feature variables that affect a microscope image generated by the generator G in different ways.

For a ready-trained generator G with an optional mapping network MN, the feature space Z or W is investigated, i.e. it is established what effects changes in a feature variable of a vector in the space Z or of a vector in the space W have on the microscope image generated from the same.

To better elucidate these aspects, the feature space W and (feature) vectors in this space are described in the following with reference to FIG. 6. The following description applies analogously to the feature space Z, which could also be adduced in the following.

FIG. 6

Figure 6:
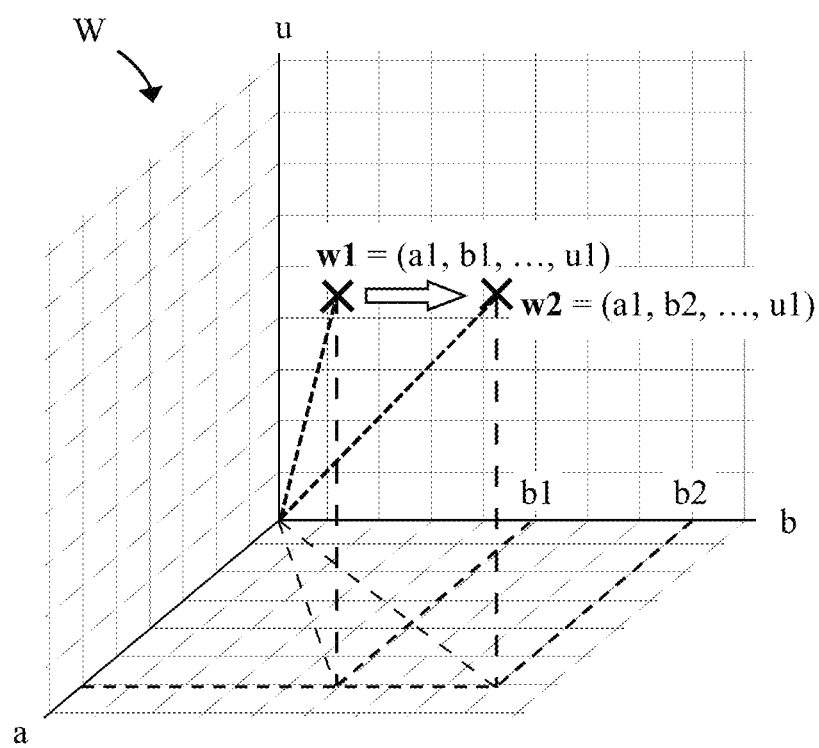
FIG. 6 schematically shows a feature space, feature vectors and feature variables.

FIG. 6 illustrates the feature space W in which a feature vector w1 is plotted. The feature space W is also referred to as the latent space and the feature vector w1 is also called the latent code of a microscope image. The feature space W is spanned by a plurality of axes or feature variables, of which three feature variables a, b and u are shown by way of example. The number of feature variables can be, for example, 512. The feature vector w1 is formed by numerical values a1, b1, u1 for the feature variables. If the feature vector w1 is input into the generator G described in the foregoing, the generator G can calculate a specific microscope image therefrom.

To investigate the feature space W, it is possible to change, for example, the feature variable b and observe the effect on the microscope image generated in the process. In the example shown, the numerical value b1 of the feature vector w1 is changed to a numerical value b2, whereby a changed feature vector w2 is generated. By comparing the two microscope images calculated from the feature vectors w1 and w2, a user can determine which image property is changed by the feature variable b. This procedure can be carried out for all feature variables a, b, . . . , u in a plurality of feature vectors.

Other approaches are also possible for establishing a semantics of the feature variables, i.e. for determining a correlation between image properties and feature variables. To avoid redundancy here, reference is made to the foregoing general description of the present application.

FIGS. 7 and 8

FIG. 7 shows an established correlation of feature variables a-u of the feature space W with image features B. The correlation is valid for a specific, ready-trained generative network Gen. If the generative network Gen were to be re-trained (with the same or different training data), the feature space W would acquire a different structure so that the correlation between feature variables a to u and image features B would have to be re-established.

In the example shown, the feature variable a determines a color of an adhesive label on a sample carrier. The feature variable b determines a visibility of the clips of a holding frame in a microscope image. The feature variable c determines a contamination on the sample carrier, e.g. punctiform grains of dust or lint. The feature variable d determines the illumination, in particular a total image brightness. The feature variable e determines a visibility or suppression of a background visible through a transparent sample carrier and/or laterally next to the sample carrier. The feature variable u determines a position of the holding frame within the microscope image.

A feature variable does not necessarily have to be one of the axes that span the feature space. Rather, a feature variable can have an in principle arbitrary direction within the feature space W. This is illustrated in FIG. 8, which shows a feature variable F formed as a linear combination of the feature variables a to u which span the feature space. The feature variables a to u are multiplied by specific factors $F_1$, $F_2$, $F_3$ in order to form the feature variable F. In this example, the feature variable F indicates the image property "visibility of cover slip edges". The feature variable F and its factors $F_1$-$F_3$ can be established by comparing the feature vectors of a plurality of microscope images. For example, the feature variable F can be established by starting with a plurality of microscope images which differ in one image property. The corresponding feature vectors in the feature space W are established for these microscope images. A difference between the feature vectors reveals the feature variable which primarily affects the cited image property and does not affect or hardly affects other image properties. This feature variable can be a vector with an essentially arbitrary orientation in the feature space W. The microscope images employed for this purpose do not all have to be unedited microscope images as captured by the microscope of FIG. 1. Rather, it is also possible for a microscope image to have been modified manually or by means of a separate image processing program, e.g. in order to improve visibility of the cover slip edges (by increasing a difference in brightness between the cover slip edges and the surrounding area in the microscope image) or by removing contaminants and artefacts on the sample carrier from a microscope image through image processing. Such modified microscope images can also form part of the training dataset of the generative model.

An image property B of a particular microscope image can now be changed in a targeted manner as described in greater detail with reference to the following figure.

FIG. 9

Figure 9:
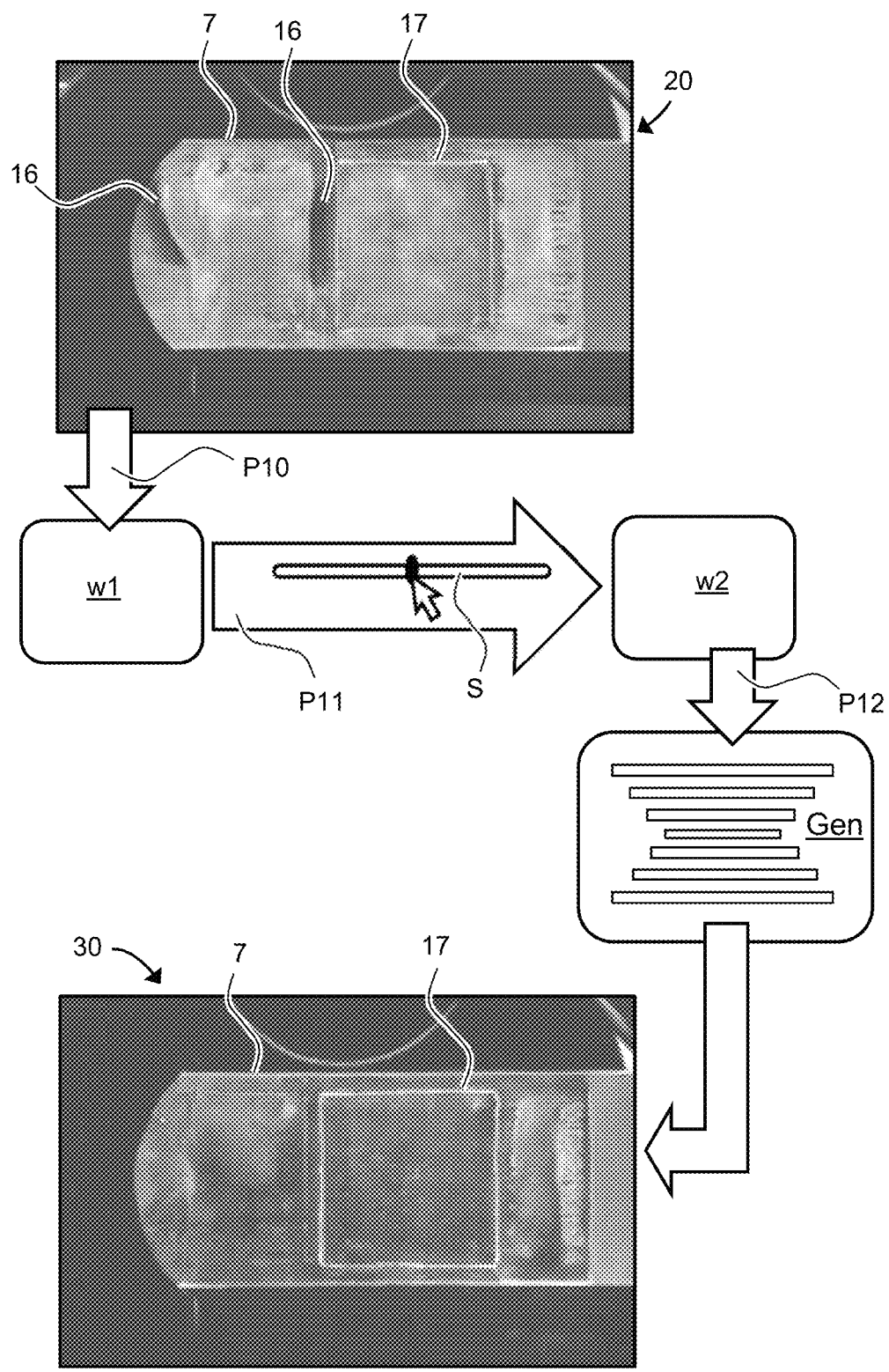
FIG. 9 schematically shows an example embodiment of a method of the invention.

FIG. 9 illustrates the editing of a microscope image 20 to be modified in the feature space.

It is not necessary for the microscope image 20 to be modified to have been part of the training dataset T of the described generative model G. In the microscope image 20 to be modified, a sample carrier 7, cover slip edges 17 and darker areas of holding frame clips 16 are discernible. It is intended to remove the holding frame clips 16 from the microscope image 20 to be modified.

To this end, a projection of the microscope image 20 to be modified into the feature space W is carried out in process P10. That is to say that the feature vector (latent code) w1 is established which, when input into the generator G, calculates an output image that is identical or as identical as possible to the microscope image 20 to be modified. The feature vector w1 can be established, for example, by starting with a predetermined or randomly chosen feature vector in the space W and iteratively adjusting its feature variables so that a deviation between the image calculated therefrom and the microscope image 20 to be modified is minimized.

Once the feature vector w1 has been obtained, the feature variable corresponding to the image property to be changed is modified in process P11. In this example, the feature variable that determines the visibility of holding frame clips 16 is modified. The feature variables can be modified manually or automatically. For example, a slider S or some other selection option can be displayed to a user for a manual modification. By means of the change in the feature variables, a modified feature vector w2 is generated. The feature vectors w1 and w2 can lie in relation to each other as illustrated in FIG. 6 so that the feature variable b is changed from the value b1 to the value b2.

The modified feature vector w2 is input in process P12 into the generative network Gen, which calculates an output image, called the modified microscope image 30 here, from said modified feature vector w2. The modified microscope image 30 differs from the microscope image 20 to be modified essentially alone in the changed image property. In the present example, the dark image areas of the holding frame clips 16 are accordingly not as visible or not visible at all in the modified microscope image 30.

The modified microscope image 30 shown is an actual test result calculated with a generator G from the shown microscope image 20 to be modified, the depiction in FIG. 9 merely being supplemented by a conversion into greyscale.

FIG. 10

Figure 10:
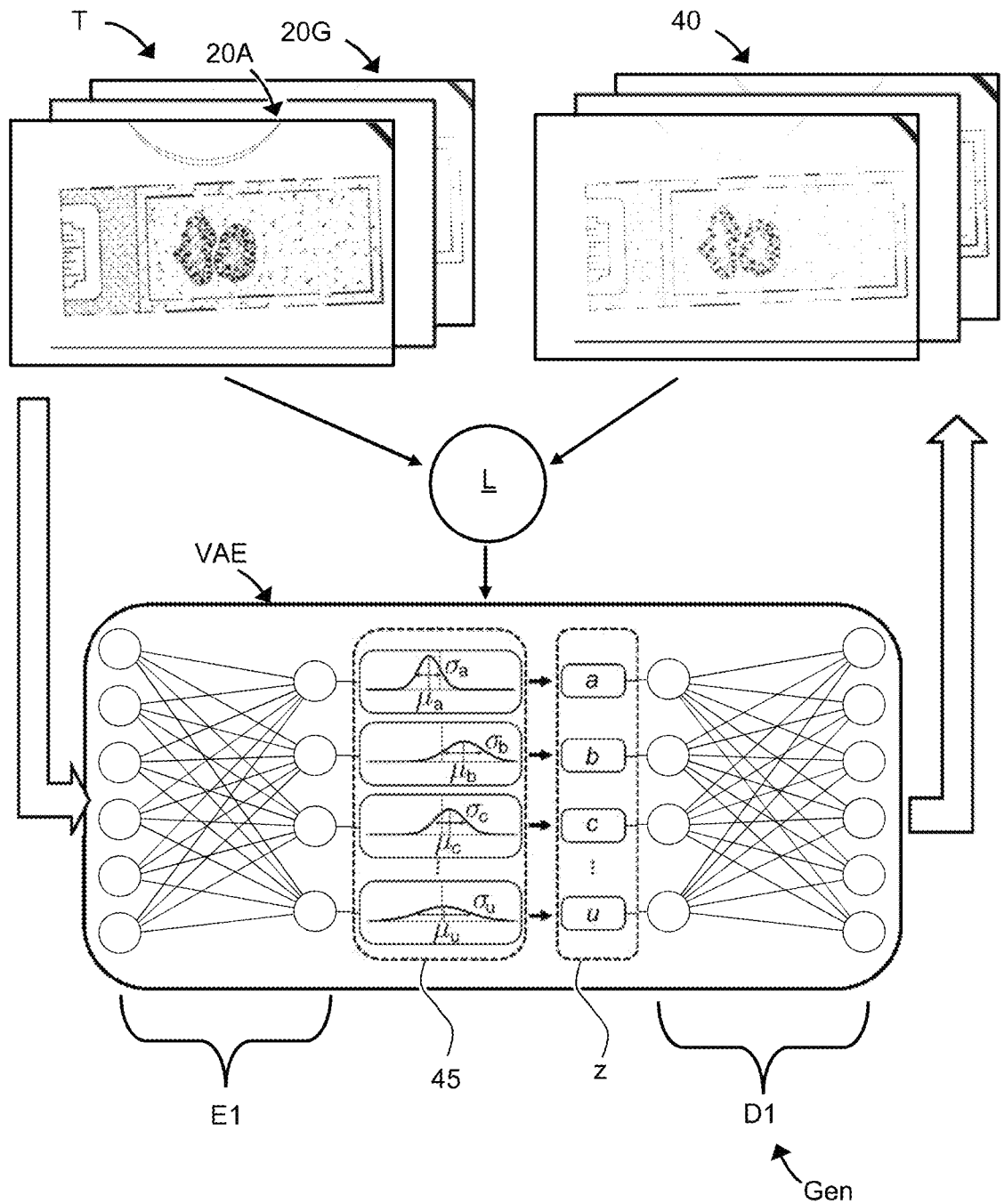
FIG. 10 schematically shows the structure and the training of a variational autoencoder according to example embodiments of methods of the invention.

FIG. 10 shows a structure and a training of a generative model of a further example embodiment of a method according to the invention.

A generative model forming part of a GAN was described with reference to FIGS. 3-5. In the example embodiment of FIG. 10, on the other hand, a decoder D1 of a variational autoencoder VAE is implemented as the generative model Gen.

The variational autoencoder VAE comprises an encoder E1 into which training images T comprising microscope images 20A-20G are input in the training. The encoder E1 generates from each of the microscope images 20A-20G a respective output 45 which, instead of constituting a point in a feature space Z, indicates a distribution in the feature space Z. An associated distribution is output for each feature variable of the feature space, wherein the distributions can each be defined by a distribution mean $\mu_a$ to $\mu_u$ and a distribution width $\sigma_a$ to $\sigma_u$. A point/feature vector z randomly selected from these distributions is input into the decoder D1 in the training. The feature vector z comprises concrete numerical values for the feature variables a to u.

The decoder D1 calculates, from the feature vector z, a generated microscope image 40 as its intended output. The generated microscope image 40 and the associated microscope image 20A are input into a loss function L, which measures deviations between these images. Model parameter values of the variational autoencoder VAE are iteratively adjusted in the training in order to minimize the loss function L. Upon completion of the training, the variational autoencoder VAE is able to reconstruct an input microscope image, i.e. the output of the variational autoencoder VAE is essentially identical to the input image.

Since the output 45 of the encoder E1 is a distribution, it is learned that points lying close together in the feature space Z from which a point/feature vector is input into the decoder D1 yield similar results. The feature space Z thereby obtains a structure in a manner similar to the one described in relation to the feature space of the GAN.

Upon completion of the training, a semantics of feature variables is established as described in relation to the feature space of the GAN.

The encoder E1 and the decoder D1 can subsequently be implemented in order to process a microscope image to be modified in a desired manner. This occurs as described with reference to FIG. 9. The process P10, in which a feature vector is calculated from the microscope image to be modified, is performed by means of the encoder E1, whose output 45 defines the feature vector. For example, it is possible to use the distribution means $\mu_a$ to $\mu_u$ as feature variables a to u of the feature vector for the input microscope image to be modified. The decoder D1 acts as a generative model Gen.

The various processes of methods according to the invention are summarized with reference to the following figure.

FIG. 11

Figure 11:
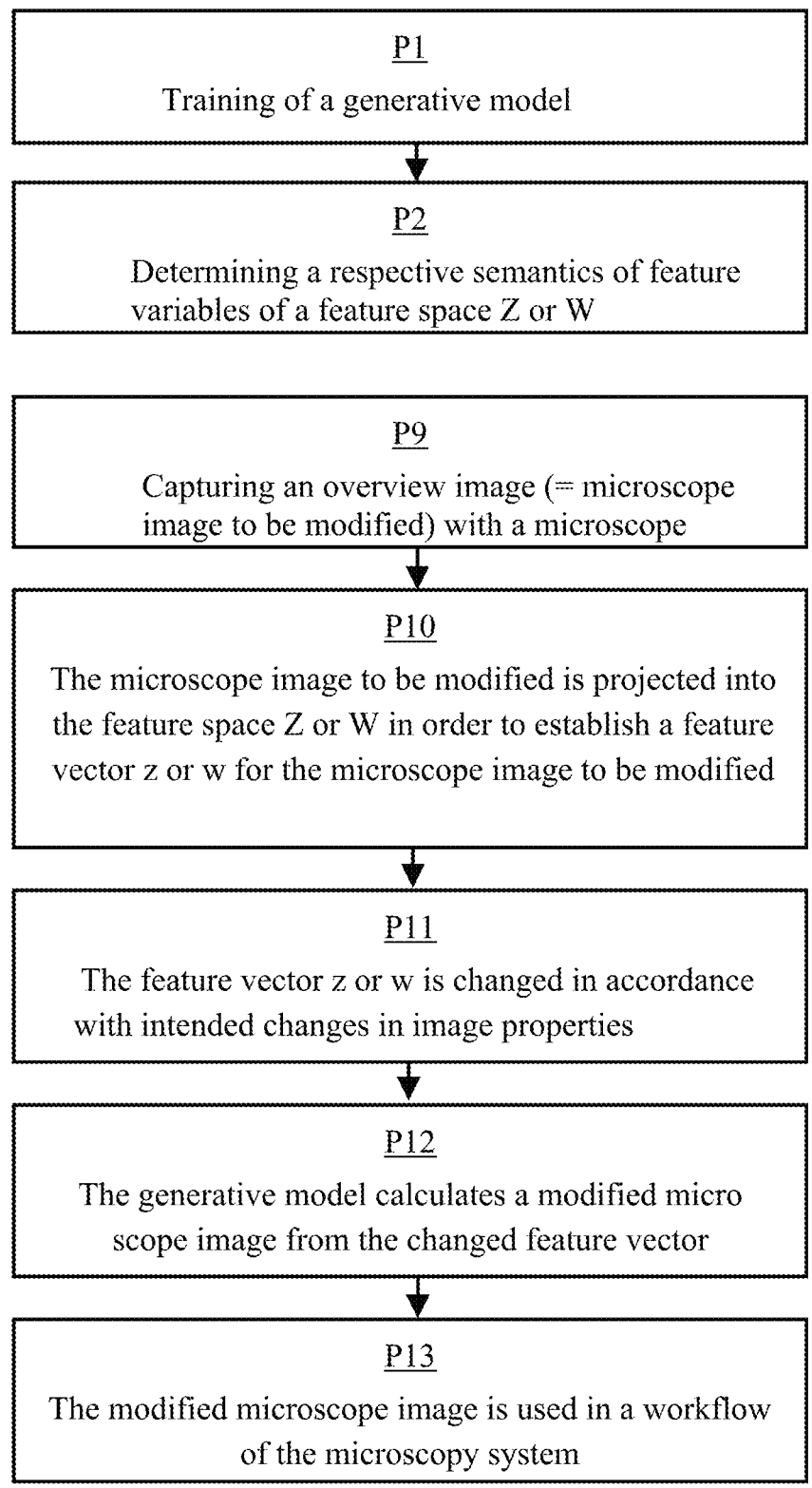
FIG. 11 shows flowcharts relating to example embodiments of methods of the invention.

FIG. 11 shows a flowchart with processes P1 and P2 which must be carried out before microscope images can be modified with respect to an image property in a targeted manner.

In process P1, a generative model is trained. This can occur as described with reference to FIGS. 3-5 or FIG. 10.

In process P2, a respective semantics is determined for a plurality of feature variables of a feature space, i.e. it is established which image property is primarily affected by which feature variable. This can occur as described with reference to FIG. 6.

In process P9, an overview image is captured with a microscope, which overview image serves as the microscope image to be modified.

In order to change an image property of the microscope image to be modified, a projection of the microscope image to be modified into a feature space (latent space) Z or W is calculated in process P10, whereby a feature vector (latent code) z or w is calculated which represents the microscope image to be modified. In process P11, one or more feature variables of the feature vector z or w are modified according to the desired change in an image property. Then, in process P12, an image (the modified microscope image) is calculated from the modified feature vector, as recounted with reference to FIG. 9.

In process P13, the modified microscope image is used in a workflow of the microscopy system. For example, the modified microscope image can serve as a navigation map in which a location to be positioned by the sample stage is selected by a user or automatically established by means of software. The modified microscope image can also be input into a subsequent image processing program, e.g. in order to localize and/or identify objects in the image.

The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
6 Sample stage
7 Sample carrier
8 Microscope camera
9 Overview camera
9A Field of view of the overview camera
9B Mirror
10 Computing device
11 Computer program
16 Holding frame
17 Cover slip edge
18 Labelling field
20 Microscope image/microscope image to be modified
20A-20G Microscope images of the training dataset
30 Modified microscope image
40 Generated microscope images
45 Output of the encoder E1 of the autoencoder VAE
100 Microscopy system
a, b, . . . , u Feature variables spanning the feature space
A Autoencoder
B Image properties defined by feature variables in the feature space
d Output/Discrimination result of the discriminator of the GAN
D Discriminator of the GAN
D1 Decoder of the autoencoder VAE
E1 Encoder of the autoencoder VAE
F Feature variable represented as a combination of the feature variables a, b, . . . , u
F1-F3 Components/factors of the feature variables F
GAN Generative adversarial networks
G Generator of the GAN
Gen Generative model, e.g. generator of the GAN or decoder of the VAE
L Loss function
MN Mapping network
P1 Training a generative model
P2 Determining a respective semantics of feature variables of a feature space Z or W
P9 Capturing an overview image
P10 Establishing a feature vector z or w for a microscope image to be modified
P11 Changing the feature vector z or w in accordance with intended changes in image properties
P12 Calculating a modified microscope image from the changed feature vector by means of the generative model
P13 Using the modified microscope image in a workflow of the microscopy system
S Slider for changing the value of a feature variable
T Training dataset/training images
VAE Variational autoencoder
w Feature vector with feature variables a, b, . . . , u
w1 Feature vector of the microscope image to be modified with feature variables a1, b1, . . . , u1
w2 Modified feature vector with feature variables a1, b2, . . . , u1
W Feature space spanned by the feature variables a, b, . . . , u
z (Random) feature vector in the feature space Z
Z Feature space
$\mu_a$-$\mu_u$ Distribution means of an output of the encoder of the VAE
$\sigma_a$-$\sigma_u$ Distribution widths of an output of the encoder of the VAE

What is claimed is:

1. A computer-implemented method for modifying microscope images, comprising:
   training a generative model using a training dataset which comprises a plurality of microscope images, wherein after the training the generative model is configured to calculate a generated microscope image from a feature vector derived from a feature space;
   establishing which image properties are affected by which feature variables in the feature space;
   receiving a microscope image to be modified;
   projecting the microscope image to be modified into the feature space in order to obtain an associated feature vector;
   generating a modified feature vector by modifying one or more feature variables of the feature vector in order to change one or more image properties; and
   generating a modified microscope image from projecting the modified feature vector back into an image space by inputting the modified feature vector into the generative model.

2. The computer-implemented method according to claim 1,
   wherein the generative model is formed by a generator of a generative adversarial network,
   wherein the modified microscope image is input into a discriminator of the generative adversarial network, wherein whether image artefacts were caused by the modification of the feature vector is inferred as a function of an output of the discriminator.

3. The computer-implemented method according to claim 1,
   wherein the generative model is formed by a generator of generative adversarial networks or by a decoder of an autoencoder.

4. The computer-implemented method according to claim 1,
   wherein the one or more image properties relate to one or more of the following:
   an exposure of an image or image area;
   a contamination of a sample carrier or cover slip area;
   a contrast of cover slip edges;
   reflections, local dimming or other artefacts on a sample carrier;
   background artefacts visible through a transparent sample carrier; and
   a background illumination.

5. The computer-implemented method according to claim 1, further comprising:
   providing a selection option with which a user can specify an intended change in the at least one image property, wherein one or more feature variables of the feature vector are modified in accordance with the intended change.

6. The computer-implemented method according to claim 1,
   wherein one or more of the feature variables of the feature vector are automatically modified in accordance with predetermined criteria.

7. The computer-implemented method according to claim 1, further comprising:
   inputting the modified microscope image into a trained inspection model or into an inspection program configured to establish whether image artefacts were caused by the modification of the feature vector.

8. A computer-implemented method of calculating an image processing result for an input image, wherein an image processing program calculates the image processing result for the input image by first:
   carrying out the method according to claim 1, wherein the modification of one or more feature variables of the feature vector occurs in accordance with requirements of the image processing program,
   and subsequently:
   inputting the modified microscope image into the image processing program, which calculates the image processing result therefrom.

9. A computer-implemented method for modifying microscope images, comprising:
   receiving a microscope image to be modified;
   generating a modified microscope image using a generative model, wherein the generative model has been trained, using a training dataset which comprises a plurality of microscope images, to calculate a generated microscope image from a feature vector derived from a feature space, wherein at least the following steps are performed to generate the modified microscope image using the generative model:
   projecting the microscope image to be modified into the feature space in order to obtain an associated feature vector;
   generating a modified feature vector by modifying one or more feature variables of the feature vector in order to change one or more image properties; and
   generating the modified microscope image from projecting the modified feature vector back into an image space by inputting the modified feature vector into the generative model.

10. The computer-implemented method according to claim 9,
    wherein the generative model is formed by a generator of generative adversarial networks or by a decoder of an autoencoder.

11. The computer-implemented method according to claim 9,
    wherein the one or more image properties relate to one or more of the following:
    an exposure of an image or image area;
    a contamination of a sample carrier or cover slip area;
    a contrast of cover slip edges;
    reflections, local dimming or other artefacts on a sample carrier;
    background artefacts visible through a transparent sample carrier; and
    a background illumination.

12. The computer-implemented method according to claim 9, further comprising:
    providing a selection option with which a user can specify an intended change in the at least one image property, wherein one or more feature variables of the feature vector are modified in accordance with the intended change.

13. The computer-implemented method according to claim 9,
    wherein one or more of the feature variables of the feature vector are automatically modified in accordance with predetermined criteria.

14. The computer-implemented method according to claim 9, further comprising:
    inputting the modified microscope image into a trained inspection model or into an inspection program configured to establish whether image artefacts were caused by the modification of the feature vector.

15. The computer-implemented method according to claim 9,
wherein the generative model is formed by a generator of a generative adversarial network,
wherein the modified microscope image is input into a discriminator of the generative adversarial network, wherein it whether image artefacts were caused by the modification of the feature vector is inferred as a function of an output of the discriminator.

16. A computer-implemented method of calculating an image processing result for an input image,
wherein an image processing program calculates the image processing result for the input image by first:
carrying out the method according to claim 9, wherein the modification of one or more feature variables of the feature vector occurs in accordance with requirements of the image processing program, and subsequently:
inputting the modified microscope image into the image processing program, which calculates the image processing result therefrom.

17. A microscopy system, comprising:
a microscope for capturing microscope images; and
a computing device which is configured to execute the method according to claim 1.

18. A computer-readable storage medium, comprising commands which, when executed by a computer, cause the computer to execute the method according to claim 1.

19. The computer-implemented method according to claim 8, wherein the image processing program is a segmentation model, a detection model, a classification model, or a model for image-to-image mapping.

20. The computer-implemented method according to claim 16, wherein the image processing program is a segmentation model, a detection model, a classification model, or a model for image-to-image mapping.

* * * * *